US006231189B1

(12) United States Patent
Colucci et al.

(10) Patent No.: US 6,231,189 B1
(45) **Date of Patent: *May 15, 2001**

(54) DUAL POLARIZATION OPTICAL PROJECTION SYSTEMS AND METHODS

(75) Inventors: D'nardo Colucci, Durham; Richard W. Zobel, Jr., Raleigh; David T. Bennett, Chapel Hill; Raymond L. Idaszak, Apex, all of NC (US)

(73) Assignee: Elumens Corporation, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/618,442

(22) Filed: Mar. 19, 1996

Related U.S. Application Data

(63) Continuation-in-part of application No. 08/593,699, filed on Jan. 29, 1996, now Pat. No. 5,762,413.

(51) Int. Cl.[7] ...................................................... G03B 21/14
(52) U.S. Cl. ................................ 353/20; 353/122; 353/69
(58) Field of Search .................................. 353/8, 20, 31, 353/34, 37; 349/8, 9, 5

(56) References Cited

U.S. PATENT DOCUMENTS

| | | | | |
|---|---|---|---|---|
| 3,904,289 | | 9/1975 | Yager | 353/122 |
| 3,961,334 | * | 6/1976 | Whitby et al. | 353/20 |
| 4,131,345 | | 12/1978 | Carollo | 352/132 |
| 4,573,924 | | 3/1986 | Nordberg | 434/20 |
| 4,588,382 | | 5/1986 | Peters | 434/44 |
| 4,597,633 | | 7/1986 | Fussell | 350/125 |
| 4,763,280 | | 8/1988 | Robinson et al. | 364/518 |
| 4,964,718 | | 10/1990 | Van Hoogstrate et al. | 353/31 |
| 5,004,331 | | 4/1991 | Haseltine et al. | 350/443 |
| 5,023,725 | | 6/1991 | McCutchen | 358/231 |
| 5,042,921 | * | 8/1991 | Sato et al. | 349/9 |
| 5,071,209 | | 12/1991 | Chang et al. | 359/19 |
| 5,121,983 | * | 6/1992 | Lee | 353/20 |
| 5,172,254 | * | 12/1992 | Atarashi et al. | 353/20 |
| 5,242,306 | | 9/1993 | Fisher | 434/44 |
| 5,274,405 | | 12/1993 | Webster | 351/158 |
| 5,281,960 | | 1/1994 | Dwyer, III | 345/31 |
| 5,300,942 | | 4/1994 | Dolgoff | 345/32 |

(List continued on next page.)

FOREIGN PATENT DOCUMENTS

| | | | |
|---|---|---|---|
| 01106689 | 4/1989 | (EP) . | |
| 01201693 | 8/1989 | (EP) . | |
| 0 458 463 A1 | 11/1991 | (EP) . | |
| 0 560 636 A1 | 9/1993 | (EP) . | |
| 06202140 | 7/1994 | (EP) . | |
| WO91/07696 | 5/1991 | (WO) | G03B/35/16 |

OTHER PUBLICATIONS

David Shafer; Simple method for designing lenses; 1980, SPIE vol. 237, pp234–241.

*Primary Examiner*—William Dowling
(74) *Attorney, Agent, or Firm*—Myers Bigel Sibley & Sajovec

(57) ABSTRACT

A dual polarization optical projection system and method combines images from first and second image sources. The first image source includes a first array of image pixels wherein the first image source generates a first pixel image having a first polarization. The second image source includes a second array of image pixels wherein the second image source generates a second pixel image having a second polarization orthogonal to the first polarization. The first pixel image having the first polarization is combined with the second pixel image having the second polarization to form a combined pixel image. Each pixel of the combined pixel image corresponds to a combination of a first pixel from the first array of image pixels having the first polarization and a second pixel from the second array of image pixels having the second polarization.

36 Claims, 6 Drawing Sheets

U.S. PATENT DOCUMENTS

| | | | | |
|---|---|---|---|---|
| 5,347,398 | | 9/1994 | Debize | 359/648 |
| 5,389,982 | * | 2/1995 | Lee | 353/20 |
| 5,394,198 | | 2/1995 | Janow | 348/744 |
| 5,500,747 | | 3/1996 | Tanide et al. | 359/40 |
| 5,502,481 | | 3/1996 | Dentinger et al. | 348/51 |
| 5,537,144 | | 7/1996 | Faris | 348/58 |
| 5,553,203 | | 9/1996 | Faris | 395/115 |
| 5,575,548 | * | 11/1996 | Lee | 353/8 |
| 5,601,353 | | 2/1997 | Naimark et al. | 353/122 |
| 5,617,152 | * | 4/1997 | Stolov | 353/84 |
| 5,626,408 | * | 5/1997 | Heynderickx et al. | 353/20 |
| 5,762,413 | * | 6/1998 | Colucci et al. | 353/69 |
| 5,826,959 | * | 10/1998 | Atsuchi | 353/20 |
| 5,833,338 | * | 11/1998 | Barak | 353/20 |
| 5,863,125 | * | 1/1999 | Doany | 353/20 |
| 6,034,717 | | 3/2000 | Dentinger et al. | 348/51 |

* cited by examiner

DUAL POLARIZATION OPTICAL PROJECTION SYSTEMS AND METHODS

FIELD OF THE INVENTION

This application is a continuation-in-part of application Ser. No. 08/593,699 entitled "Tiltable Hemispherical Optical Projection Systems And Methods Having Constant Angular Separation of Projected Pixels" filed Jan. 29, 1996, now U.S. Pat. No. 5,762,413, the disclosure of which is hereby incorporated herein in its entirety by reference.

FIELD OF THE INVENTION

This invention relates to optical systems and methods, and more particularly to optical projection systems and methods.

BACKGROUND OF THE INVENTION

Hemispherical optical projection systems and methods, i.e. systems and methods which project images at an angle of at least about 160 degrees, are used to project images onto the inner surfaces of domes. Hemispherical optical projection systems and methods have long been used in planetariums, commercial and military flight simulators and hemispherical theaters such as OMNIMAX® theaters. With the present interest in virtual reality, hemispherical optical projection systems and methods have been investigated for projecting images which simulate a real environment. Such images are typically computer-generated multimedia images including video, but they may also be generated using film or other media. Home theater has also generated much interest, and hemispherical optical projection systems and methods are also being investigated for home theater applications.

Heretofore, hemispherical optical projection systems and methods have generally been designed for projecting in a large dome having a predetermined radius. The orientation of the hemispherical projection has also generally been fixed. For example, planetarium projections typically project vertically upward, while flight simulators and hemispherical theaters typically project at an oblique angle from vertical, based upon the audience seating configuration. Hemispherical optical projection systems and methods have also generally required elaborate color correction and spatial correction of the image to be projected, so as to be able to project a high quality image over a hemisphere.

Virtual reality, home theater and other low cost applications generally require flexible hemispherical optical projection systems and methods which can project images onto different size domes and for different audience configurations. The optical projection systems and methods should also project with low optical distortion over a wide field of view, preferably at least about 160 degrees. Minimal color correction and spatial correction of the image to be projected should be required. A high intensity image should be projected, and it is desirable to have the capability of projecting three-dimensional images.

SUMMARY OF THE INVENTION

It is therefore an object of the present invention to provide improved optical projection systems and methods.

It is another object of the present invention to provide optical projection systems and methods which can project images with high intensity.

It is yet another object of the present invention to provide optical projection systems and methods which can project three-dimensional images.

These and other objects are provided, according to the present invention, by a projection system and method which combine the image generated by two image sources. The image generated by the first image source has a first polarization, and the image produced by the second image source has a second polarization orthogonal to the first polarization. The combined image thus includes two colineated beams (i.e., beams having the same optical axis) with orthogonal polarizations. The two images can be the same thereby increasing the intensity of the combined image, or the two images can represent right and left eye views thereby producing a three-dimensional effect. Alternatively, the two images can be offset by a sub-pixel, thereby providing higher resolution.

In particular, the first image source includes a first array of image pixels wherein the first image source generates a first pixel image having a first polarization. The second image source includes a second array of image pixels wherein the second image source generates a second pixel image having a second polarization orthogonal to the first polarization. The first pixel image having the first polarization is combined with the second pixel image having the second polarization to form a combined pixel image. Each pixel of the combined pixel image corresponds to a combination of a first pixel from the first array of image pixels having the first polarization and a second pixel from the second array of image pixels having the second polarization.

If the first and second pixel images comprise the same image, the combined pixel image can have an increased intensity. Alternately, if the first and second pixel images comprise different images, the combined pixel image can be used to project a three-dimensional image. That is, when projected onto a viewing surface, a viewer who wears glasses with orthogonal polarization filters will see a different image with each eye. In yet another alternative, the images can be offset by a sub-pixel to increase resolution. The image sources can include a reflective liquid crystal display (such as a ferroelectric liquid crystal display), a transmissive liquid crystal display, or a liquid crystal layer and an image generator for generating an image on the liquid crystal layer.

The dual polarization optical projection systems and methods may be used to project the combined pixel image onto any surface. However, the combined pixel image is preferably projected into a hemispherical projection having constant angular separation among adjacent pixels. Accordingly, the dual polarization optical projection systems and methods can project the combined pixel image onto hemispherical surfaces of varying radii without requiring spatial distortion correction of the first and second arrays of image pixels. The dual polarization optical projection systems and methods can also include a dome including a truncated spherical inner dome surface. The constant angular projecting system is preferably mounted at the center of the dome. to radially project the combined pixel image onto the inner dome surface.

The dual polarization optical projection systems and methods can also project the combined pixel image onto a hemispherical surface at a projection angle of at least 160 degrees. Furthermore, at least part of the projecting means can be tilted, such that the combined pixel image is projected in one of a plurality of selectable positions. Accordingly, the same projection systems and methods can be used both as a planetarium as well as a hemispherical theater, for example.

Each of the first and second pixel images preferably has a common image size. In addition, the projection systems and methods also preferably include a projection lens assembly which projects the combined pixel image onto a hemispherical surface at a projection angle of at least 160 degrees. This lens assembly is spaced apart from the first and second image sources by a separation distance which is at least six times the image size.

The dual polarization optical projection system and method may also include first and second filters adjacent respective first and second image sources. The first filter includes a first color portion adjacent a first pixel of the first image source which selectively passes a first color of light. The first filter also includes a second color portion adjacent a second pixel of the first image source which selectively passes a second color of light. The second filter includes a first color portion adjacent a first pixel of the second image source which selectively passes the first color of light, and a second color portion adjacent a second pixel of the second image source which selectively passes the second color of light. Accordingly, the combined pixel image includes the first and second colors. In a preferred embodiment, three colors, such as red, green, and blue, are projected to thereby project the entire visible spectrum.

Alternately, a multi-color light source can provide light having a first color to the first and second image sources during a first predetermined time period. The multi-color light source can then provide light having a second color to the first and second image sources during a second predetermined time period. Accordingly, the combined pixel image includes the first color during the first predetermined time period and includes the second color during the second predetermined time period. By making the time periods sufficiently short, the resulting flicker will be substantially indiscernible to the human eye.

In yet another alternative, a single color light source can provide light having a single color to the first and second image sources. The combined output will thus include a single color. By combining outputs from other pairs of image sources which are provided with light of other colors, a full color projection can be provided.

The projection systems and methods of the present invention thus provides an combined pixel image wherein each pixel of the combined pixel image corresponds to a combination of a first pixel from a first array of image pixels having a first polarization and a second pixel from the second array of image pixels having the second polarization. If a common image is generated by the first and second arrays of image pixels, the combined output can have an increased intensity. If different images are generated by the first and second arrays of image pixels, the common image can provide a three-dimensional projection, or provide increased resolution.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
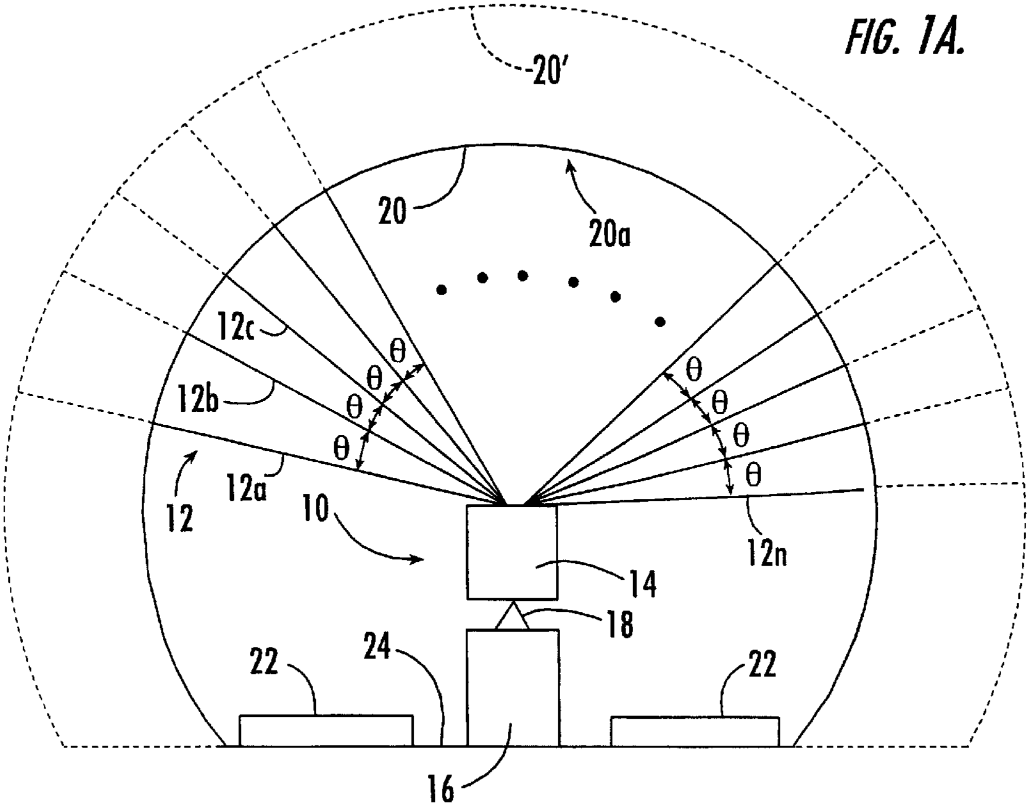
FIGS. 1A and 1B are block diagrams illustrating hemispherical optical projection systems and methods according to the present invention.
Figure 1B:
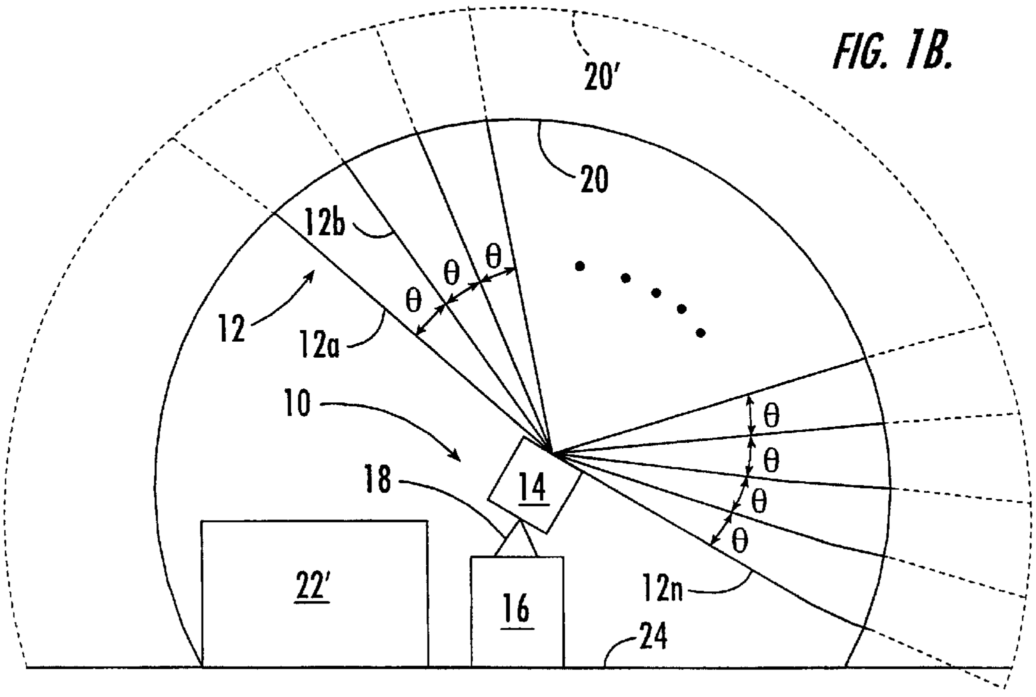

Referring now to FIGS. 1A and 1B, a tiltable hemispherical optical projection system and method having constant angular separation of projected pixels according to the present invention is described. Hemispherical optical projection system 10 projects a hemispherical projection 12 having constant angular separation among adjacent pixels as indicated by angle θ which is constant among adjacent pixels 12*a*–12*n*. For example, a circular array of 768 pixels may be projected at a constant angular separation of 13.7 arcminutes at 175 degree full field of view. Hemispherical optical projection system 10 projects the hemispherical projection having constant angular separation onto the inner surface 20*a* of truncated hemispherical dome 20.

The constant angular separation hemispherical optical projection system may be regarded as an "inverse telephoto" system having an f·θ lens. The image height is proportional to f·θ, where f is the focal length of the lens and θ is the constant angular separation among adjacent pixels.

By maintaining constant angular separation among adjacent pixels, a low distortion image can be projected by hemispherical optical projection system 10 onto domes of varying radii, shown by 20'. For example, domes of radii from 4 to 8 meters may be accommodated. In order to maintain low distortion with constant angle of separation, hemispherical optical projection system 10 is preferably mounted at the center of the inner dome surface 20*a* so as to radially project the array of pixels onto the inner dome surface.

Still referring to FIGS. 1A and 1B, the hemispherical optical projection system 10 includes means for tilting the hemispherical projection 12 having a constant angular separation among adjacent pixels, so that the constant angular separation hemispherical projecting system 10 projects the array of pixels onto a plurality of selectable positions on the inner dome surface 20*a*. For example, as shown in FIGS. 1A and 1B, projector 14 may be pivotally mounted on base 16 using pivot 18. Base 16 is located on the floor 24 of dome 20. Pivot 18 may allow pivoting within a plane or in multiple planes. The design of pivot 18 is known to those skilled in the art and need not be described further herein.

By incorporating tilting means, the optical projection system can project vertically upward in a planetarium projection as shown in FIG. 1A or may project at an angle (for example 45 degrees) from vertical in a theater projection position, as shown in FIG. 1B. Typically, when projecting in a planetarium style, as shown in FIG. 1A, the audience area 22 surrounds the projection system 10. In contrast, when projecting theater style, the audience area 22' typically behind the optical projection system 10 and the audience area 22' is raised so the audience can see the entire field of view in front of them. Thus, different audience configurations are accommodated.

Dome 20 is preferably constructed for portability and ease of assembly and disassembly. A preferred construction for dome 20 is described in copending application Ser. No. 08/593,041 to the present inventors filed Jan. 29, 1996, entitled "Multi-Pieced, Portable Projection Dome and Method of Assembling the Same" and assigned to the assignee of the present application, the disclosure of which is hereby incorporated herein by reference.

Figure 2:
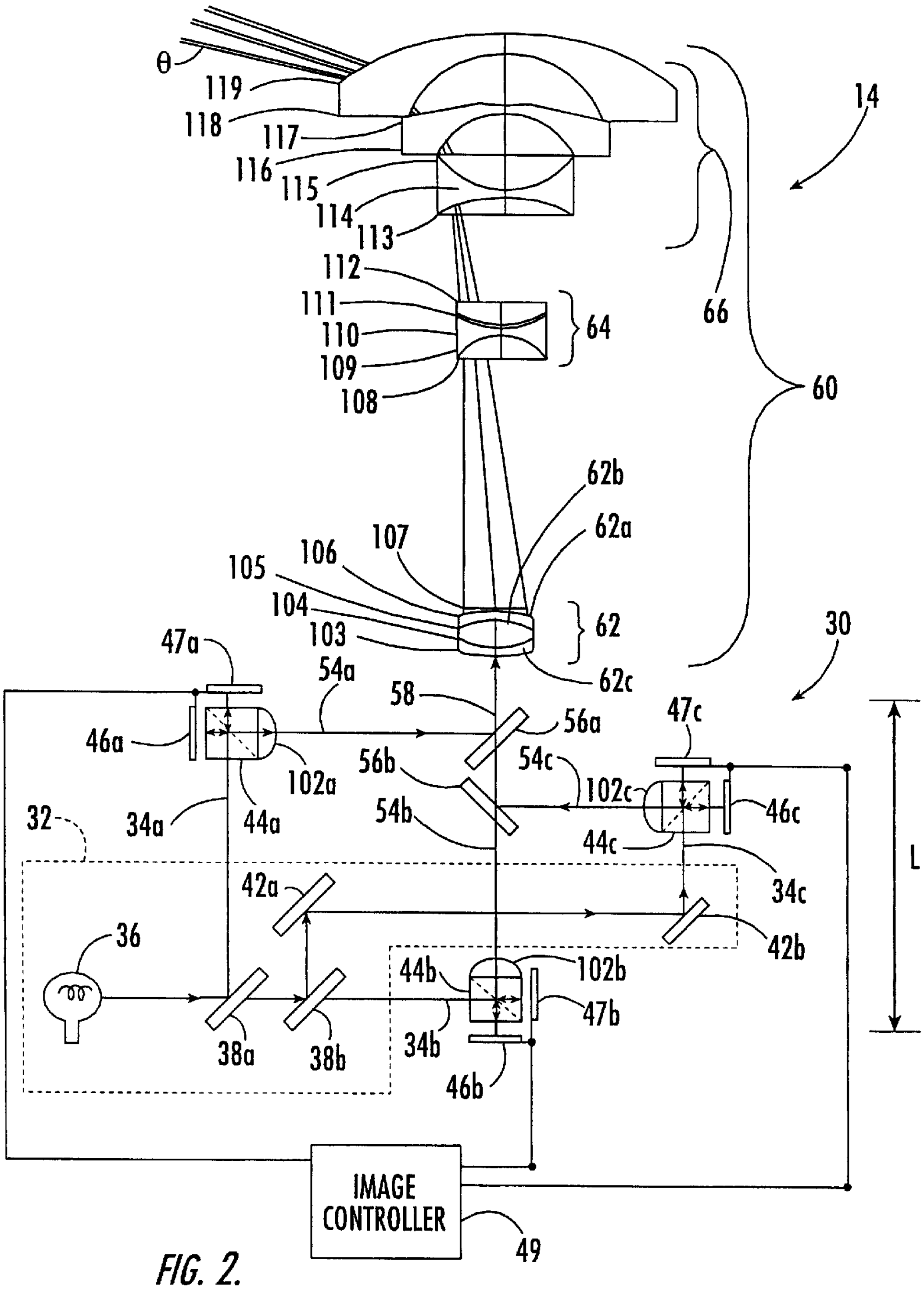
FIG. 2 is a schematic block diagram representation of a first embodiment of the projecting optics of FIGS. 1A and 1B.

Referring now to FIG. 2, a schematic representation of projector 14 is shown. Projector 14 may include a single light path for projecting gray scale images, a single light path for projecting color images, or separate red, green and blue light paths which are combined and projected, as will be described below. Projector 14 generally includes image generating optics 30 and a projecting lens assembly 60.

Image generating optics 30 includes a light source 32 for providing high intensity red, green and blue light along respective red, green and blue light paths 34*a,* 34*b* and 34*c*. As shown in FIG. 2, light source 32 includes a high intensity source of light such as arc lamp 36 and red and green notch filters 38*a* and 38*b* respectively, to reflect one color only. One or more mirrors 42*a,* 42*b* are used to reflect the light into the appropriate light paths as necessary. It will be understood that separate monochromatic sources (such as lasers) may also be used, rather than a single polychromatic (white) source and notch filters.

Continuing with the description of FIG. 2, image generating optics 30 includes three polarizing beam splitters 44*a,* 44*b* and 44*c* respectively in the red, green and blue light paths 34*a,* 34*b* and 34*c*. Each polarizing beam splitter 44*a*–44*c* reflects light which is linearly polarized orthogonal to the plane of FIG. 2 and transmits light which is linearly polarized in the plane of FIG. 2. Accordingly, light which is linearly polarized orthogonal to the plane of FIG. 2 is reflected from the respective polarizing beam splitter 44*a,* 44*b,* 44*c* to the respective image source 46*a,* 46*b,* 46*c*. Furthermore, light which is linearly polarized in the plane of FIG. 2 is transmitted from respective polarizing beam splitter 44*a,* 44*b,* 44*c* to the respective image source 47*a,* 47*b,* 47*c*.

As shown, each image source 46*a–c* and 47*a–c* can be a reflective liquid crystal display such as a twisted nematic or ferroelectric liquid crystal display. An example of a suitable ferroelectric liquid crystal display is the model DR0256B marketed by Displaytech, Inc. As will be understood by one having skill in the art, the liquid crystal display is divided into an array of individually addressable pixels. Each pixel is capable of rotating the polarization vector of light incident thereon by zero or ninety degrees. In a twisted nematic liquid crystal display, the crystals for each pixel rotate polarization by zero degrees or ninety degrees, with the intensity of the image governing the proportion of the light which is rotated by ninety degrees. For example, the lowest intensity image may rotate none of the incident light by ninety degrees, and the highest intensity image may rotate all of the incident light by ninety degrees. In a ferroelectric liquid crystal display, light from the image rotates the polarization of the incident light of the entire pixel by ninety degrees. The duty cycle of the image may be varied to control the proportion of the time in which polarization is rotated by ninety degrees. For example, the lowest intensity light may have a zero duty cycle, so that the incident light polarization is not rotated at all. The highest intensity light can have a duty cycle of one hundred percent, so that the polarization of the incident light is rotated by ninety degrees for the entire time period. An image controller 49 provides image signals, such as a driving voltage amplitude or duty cycle, to each of the image sources 46*a–c* and 47*a–c* so that the array of pixels for each image source represents at least a portion of an image.

Referring to polarizing beam splitter 44*a* together with image sources 46*a* and 47*a,* for example, the light incident on image source 46*a* is linearly polarized orthogonal to the plane of FIG. 2, while the light incident on image source 47*a* is linearly polarized in the plane of FIG. 2. The light reflected from each pixel of image sources 46*a* and 47*a* is rotated by an amount determined by the intensity or duty cycle of that pixel. As before, light which is linearly polarized orthogonal to the plane of FIG. 2 is reflected from the polarizing beam splitter 44*a,* and light which is linearly polarized in the plane of FIG. 2 is transmitted by the polarizing beam splitter 44*a*.

Accordingly, the light 54*a* which emerges from the polarizing beam splitter 44*a* includes a plurality of pixels, and each pixel includes first and second orthogonally polarized components. The first component of a pixel of light 54*a* is linearly polarized in the plane of FIG. 2, and the intensity of this component is determined by amplitude or the duty cycle of the driving voltage to the respective pixel of image source 46*a*. The second component of a pixel of light 54*a* is polarized orthogonal to the plane of FIG. 2, and the intensity of this component is determined by the amplitude or the duty cycle of the driving voltage to the respective pixel of image source 47*a*.

For example, a darkest pixel on a twisted nematic liquid crystal display 46*a* causes zero degrees of polarization rotation (i.e. rotates none of the light by ninety degrees) and the light reflected from this darkest pixel is thus completely reflected by the polarizing bean splitter 44*a* away from light beam 54*a,* while a brightest pixel on liquid crystal display 46*a* causes ninety degrees of polarization rotation (i.e. rotates all of the light by ninety degrees) and the light reflected from this brightest pixel is thus completely transmitted through the polarizing beam splitter 44*a* to light 54*a*. Conversely, a darkest pixel on liquid crystal display 47*a* causes zero degrees of polarization rotation (i.e. rotates none of the light by ninety degrees) and the light reflected from this darkest pixel is thus completely transmitted by polarizing beam splitter away from light beam 54*a,* while a brightest pixel on liquid crystal display 46*a* causes ninety degrees of polarization rotation (i.e. rotates all of the light by ninety degrees) and the light reflected from this brightest pixel is thus completely reflected by the polarizing beam splitter 44*a* to light 54*a*.

By providing the same image on image sources 46*a* and 47*a,* the intensity of light 54*a* can be doubled as compared to a system wherein only one image source is used. Accordingly, a projected image can be more brightly displayed. Alternately, by providing slightly different images on image sources 46*a* and 47*a* representing right and left eye views, light 54*a* can be projected to provide a three dimensional image. For example, a viewer can wear glasses with orthogonal polarization filters to see the projected three-dimensional image. This feature may be particularly advantageous for virtual reality applications. In yet another alternative, images which are offset by one another by less than a pixel can be provided, to provide enhanced resolution of the combined image.

The discussion of the operation of image sources 46*a* and 47*a* together with polarizing beam splitter 44*a* also applies to the operation of images sources 46*b* and 47*b* together with polarizing beam splitter 44*b,* as well as to the operation of image sources 46*c* and 47*c* together with polarizing beam splitter 44*c*. As previously discussed, each polarizing beam splitter 44*a–c* of FIG. 2 is arranged to receive light of a different color. In particular, light path 34*a* provides red light to polarizing beam splitter 44*a,* light path 34*b* provides green light to polarizing beam splitter 44*b,* and light path 34*c* provides blue light to polarizing beam splitter 44*c*.

The light 54*a–c* that emerges from respective polarizing beam splitters 44*a–c* is thus respectively colored red, green and blue. A second set of notch filters 56*a* and 56*b* act as combining means for combining the separate red, green and blue light 54*a–c* into a single combined light path 58. The combined light path enters a lens assembly 60 which projects the combined light onto a hemispherical surface at a projection angle of at least 160 degrees and a constant angular separation θ (e.g. 13.7 arcminutes) between adjacent pixels. Accordingly, each projected pixel includes a red component with orthogonal first and second polarizations, a green component with orthogonal first and second polarizations, and a blue component with orthogonal first and second polarizations.

Still referring to FIG. 2, lens assembly 60 includes three elements: a collimating lens assembly 62, a wavefront shaping lens assembly 64 and a meniscus lens assembly 66.

Figure 3:
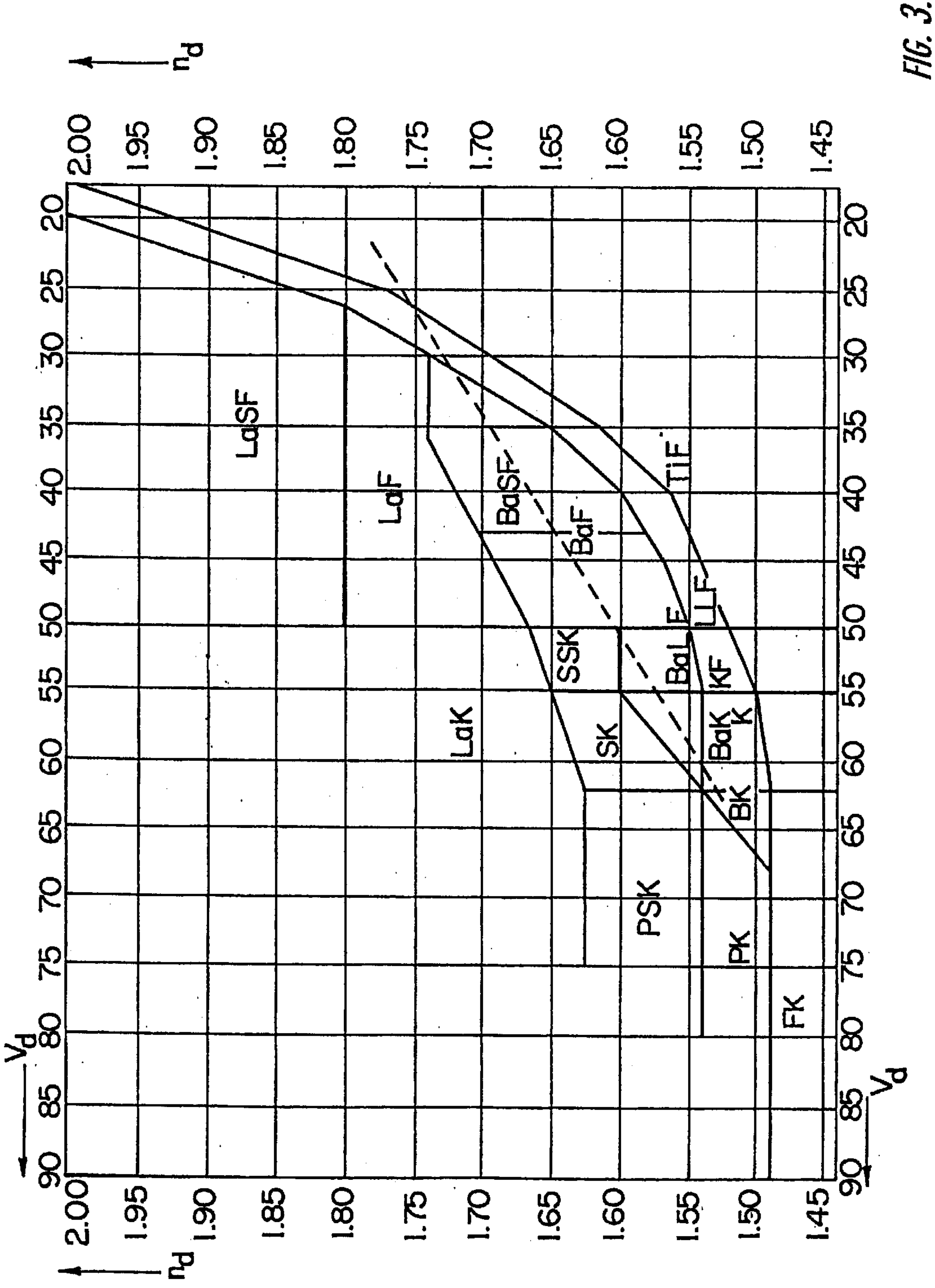
FIG. 3 is a graph of the index of refraction versus dispersion for various types of glass.

The collimating lens assembly includes at least three collimating lenses 62*a,* 62*b,* 62*c*. Each collimating lens includes an index of refraction and a dispersion. Each of the collimating lenses has a common ratio of index of refraction to dispersion. Stated differently, all three lenses lie on a common line when plotted on an index of refraction versus dispersion graph, as illustrated in FIG. 3. Lenses 62*a* and 62*c* are relatively high index and low dispersion glasses (SF4 and BASF10) respectively. Lens 62*b* is a low index, high dispersion glass (BAK4). The outer glasses 62*a* and 62*c* preferably closely match those specified in a paper by Shafer entitled "Simple Method for Designing Lenses", Proceedings of the SPIE, Volume 237, pages 234–241, 1980, for using concentric and aplanatic surfaces to minimize field aberrations. Table I illustrates the performance of the collimating lenses 62*a*–62*c*. The surfaces are labeled in FIG. 2.

TABLE I

| Surface | SPHA | COMA | ASTI | FCUR | DIST | CLA | CTR |
|---|---|---|---|---|---|---|---|
| 103 | 0.19905 | −0.05074 | 0.01293 | 0.01930 | −0.00822 | −0.10168 | 0.02592 |
| 104 | −0.14528 | 0.01565 | −0.00169 | −0.00552 | 0.00078 | 0.11196 | −0.01206 |
| 105 | −0.14321 | −0.02453 | −0.00420 | −0.00323 | −0.00127 | 0.05596 | 0.00959 |
| 106 | 0.12541 | 0.05146 | 0.02111 | 0.01544 | 0.01500 | −0.05722 | −0.02348 |
| Total | 0.03597 | −0.00816 | 0.02815 | 0.02599 | 0.00629 | 0.00092 | −0.00003 |

As shown, the lenses have low color aberration and modest coma and astigmatism. Glass choice allows good color correction while maintaining near concentric/aplanatic conditions on the first and last surfaces.

Wavefront shaping lens assembly 64 includes lenses to correct aberrations caused by meniscus lens assembly 66. In particular, the assembly 64 differentially affects wavefronts at different field points. Thus, on-axis field differential color correction and wavefront shaping is applied, compared to off-axis.

The meniscus lens assembly includes at least one meniscus lens. As known to those having skill in the art, a meniscus lens is a concavo-convex lens. The meniscus lens assembly 66 performs two functions. First, it diverges the light such that the angular separation between beams 12*a*–12*n* from adjacent pixels is nearly constant regardless of where the pixels are in the object plane. This reduces or eliminates unnatural distortion on the domed image. In particulars when the optical projection system 10 is mounted in the center of curvature of the dome, the angular separation may be maintained constant and thereby eliminate the need for distortion correction. If the optics are located off the dome center of curvature, the angular separation may need to vary to produce distortion-free images.

The meniscus lens assembly 66 also decreases the overall focal length of the system, thereby creating a very large depth of focus. Accordingly, the same lens assembly can be used across a wide range of dome sizes from about four meters to about eight meters. When combined with a constant angular separation between projected pixels, the same optical projection system may be used in all domes. Off-center curvature projection lens may have a large depth of focus, but their pixel angular separation generally must change with dome size.

In the optical projector 14 described above, the need to place and align the optical components may require the lens assembly 60 to be spaced from the liquid crystal layer 46 more than in conventional projection lenses. In particular, as shown in FIG. 2, the distance L between the liquid crystal layer 46*b* and the first lens 62*c* in lens assembly 60 is more than six times the size of the array of pixels on reflective liquid crystal displays 46*b* and 47*b*. Nonetheless, the lens assembly projects the array of image pixels 12 from the image sources such as reflective liquid crystal displays 46*a–c* and 47*a–c* to a hemispherical surface at a projection angle of at least 160 degrees.

In order to further provide a complete description of the present invention, complete lens specifications for projecting lens assembly 60 are provided below. The surfaces are labelled in FIG. 2.

Surfaces: 25

Stop Surface: 107

System Aperture: Object Space Numerical Aperture

Apodization: Uniform, factor=0.000000

Effective Focal Length: 15.1415 (in air)

Effective Focal Length: 15.1415 (in image space)

Total Track (i.e. distance from image plane to object plane): 4325.92

Image Space F/#: 0.139349

Working F/#: 180.221

Object Space Numerical Aperture: 0.1

Stop Radius; 23.0427

Entrance Pupil Diameter: 108.659

Entrance Pupil Position: 538.573

Exit Pupil Diameter: 3.04199

Exit Pupil Position: −3646.38

Field Type: Object height in Millimeters

Primary Wave: 0.588000

Lens Units: Millimeters

Wavelengths: 3

| Units: Microns | | | |
|---|---|---|---|
| Channel | Value | Weight | |
| 34a | 0.486000 | 1.000000 | |
| 34b | 0.588000 | 1.000000 | |
| 34c | 0.656000 | 1.000000 | |
| Fields: 3 | | | |
| Object Space: | 0 mm | 11 mm | 22.86 mm |
| Image Space: | 0° | 43° | 87.5° |

A surface data summary is also provided in Table II below. The surfaces are identified in FIG. 2 at 102–119.

TABLE II

SURFACE DATA SUMMARY:

| Surface | Type | Radius | Thickness, mm | Glass | Diameter | Conic |
|---|---|---|---|---|---|---|
| Liquid crystal 46 | STANDARD | Infinity | 2 | | 0 | 0 |
| 101 | STANDARD | Infinity | 90 | BK7 | 80 | 0 |
| 102 | STANDARD | −220 | 200 | | 80 | 0 |
| 103 | STANDARD | 118.7 | 7 | SP4 | 53 | 0 |
| 104 | STANDARD | 67.6 | 19 | BAK4 | 53 | 0 |
| 105 | STANDARD | −53.357 | 6.2 | BASF10 | 53 | 0 |
| 106 | STANDARD | −135.36 | 3 | | 53 | 0 |
| 107-STOP | STANDARD | Infinity | 190.6115 | | 46.05922 | 0 |
| 108 | STANDARD | −310.083 | 16 | F2 | 61 | 0 |
| 109 | STANDARD | −39.12 | 5.5 | SK16 | 61 | 0 |
| 110 | STANDARD | 66.8 | 3.1 | | 61 | 0 |
| 111 | STANDARD | 74.22 | 13 | SF6 | 61 | 0 |
| 112 | STANDARD | 314.2 | 79.25666 | | 64 | 0 |
| 113 | STANDARD | −93.22 | 6 | SK16 | 93 | 0 |
| 114 | STANDARD | 60.77 | 22 | F2 | 93 | 0 |
| 115 | STANDARD | 548.2 | 33 | | 93 | 0 |
| 116 | STANDARD | −52.92 | 7 | SK16 | 96 | 0 |
| 117 | STANDARD | −216.18 | 36.25 | | 144 | 0 |
| 118 | STANDARD | −72.867 | 14 | SF6 | 136 | 0 |
| 119 | STANDARD | −206.2 | 3575 | | 234 | 0 |
| DOME SURFACE 20a | STANDARD | Infinity | | | 0.002 | 0 |

Furthermore, it may be desirable to project light which includes orthogonal circular polarizations as opposed to the orthogonal linear polarizations discussed above. Accordingly, a quarter wavelength retardation plate can be included in each output light path 54*a–c* from each polarizing beam splitter 44*a–c*.

Figure 4:
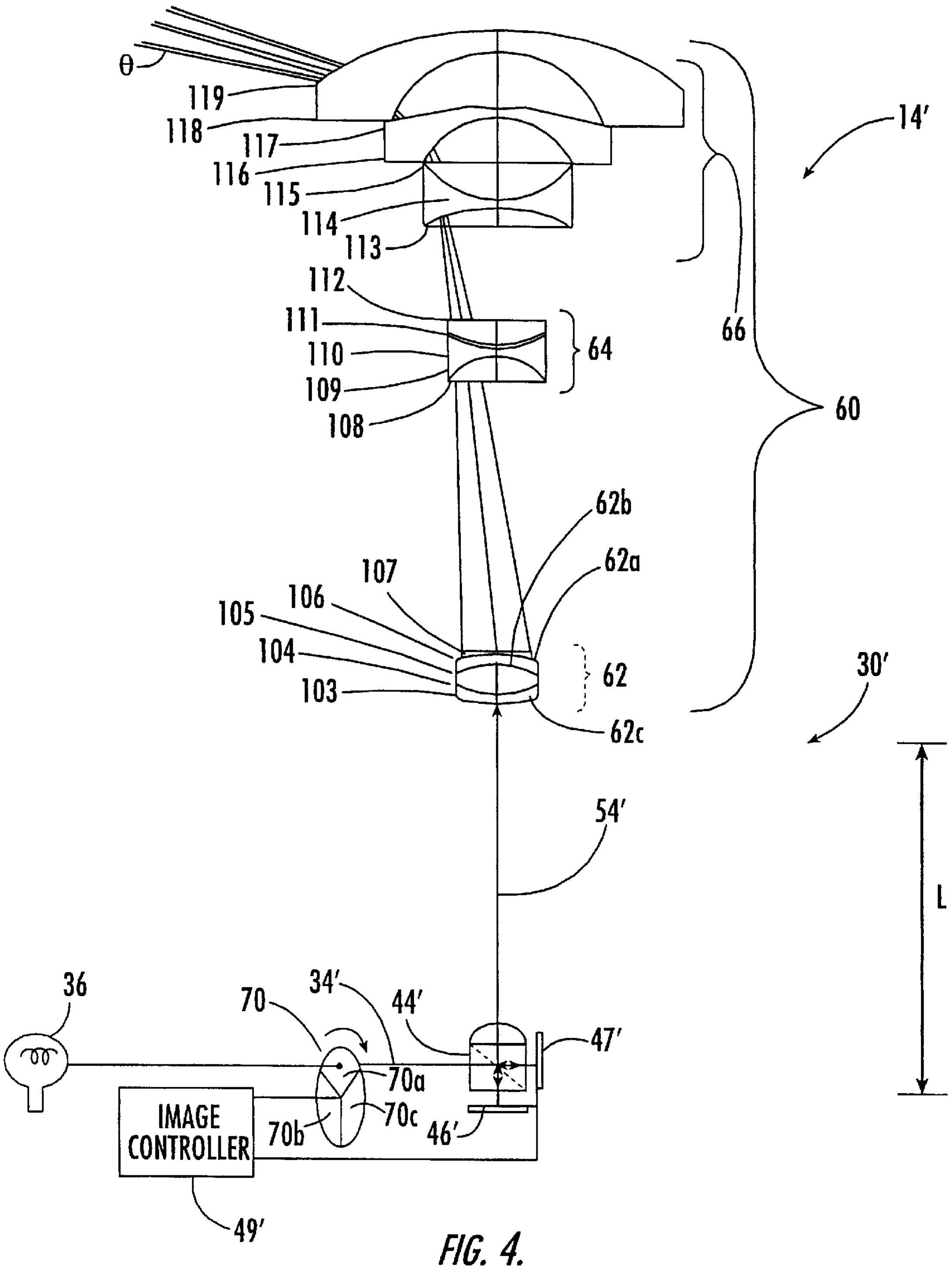
FIG. 4 is a schematic block diagram representation of a second embodiment of the projecting optics of FIGS. 1A and 1B.

An alternate embodiment of the projector 14' of the present invention is illustrated in FIG. 4. The lens assembly 60 is the same as that discussed above with regard to FIG. 2. The image generating optics 30', however, includes only one polarizing beam splitter 44' and associated image sources 46' and 47'. The light source includes arc lamp 36 and color wheel 70 with respective red, green and blue filter portions 70*a,* 70*b,* and 70*c*. Accordingly, as the color wheel 70 spins in the path of light from the arc lamp 36, the light path 34' to the polarizing beam splitter 44' sequentially provides red, green, and blue light. For example, if the color wheel spins at 180 Hz, the light path 34' can provide red light for 1.85 milliseconds, followed by green light for 1.85 milliseconds, followed by blue light for 1.85 milliseconds.

As the color of the light from light path 34' changes, the images at image sources 46' and 47' also change so that a red image is generated when red light is provided, a green image is generated when green light is provided, and a blue image is generated when blue light is provided. As before, the image generated by each image source is controlled by image controller 49'. In this embodiment, the image controller 49' may also control the rotation of the color wheel 70. Accordingly, the image controller 49' may synchronize the rotation of the color wheel with the images generated by the image sources. Alternately, independent control of the color wheel and the images may be provided. By rotating the three sector wheel at 180 HZ, each color is provided 60 times a second. This frequency is well beyond that which is detectable by the human eye so that there is no substantial visible flicker in the projection generated by the projection system 14'.

The polarizing beam splitter 44' and image sources 46' and 47' operate as discussed above with regard to FIG. 2 with the exception that the light path 34' into the polarizing beam splitter 44' sequentially provides light of each of the three primary colors at different times. Accordingly, the light path 54' out of the polarizing beam splitter 44' sequentially includes red images, green images, and blue images at different times. By alternating these red, green, and blue images at a sufficiently high frequency, the flicker will be substantially undetectable by the human eye. When projected, these images can blend into a single full color projection.

The embodiment of FIG. 4 has the advantage that the number of polarizing beam splitters and image sources for a color projection system can be cut by a third as compared to the embodiment of FIG. 2. Furthermore, the notch filters 38*a–b* and 56*a–b* and mirrors 42*a–b* of FIG. 2 can also be eliminated. This reduction in parts is accommodated by changing the images generated by image sources 46' and 47' at three times the frequency required by the embodiment of FIG. 2, and by synchronizing the rotation of the color wheel 70 with the changing of the images.

Figure 5:
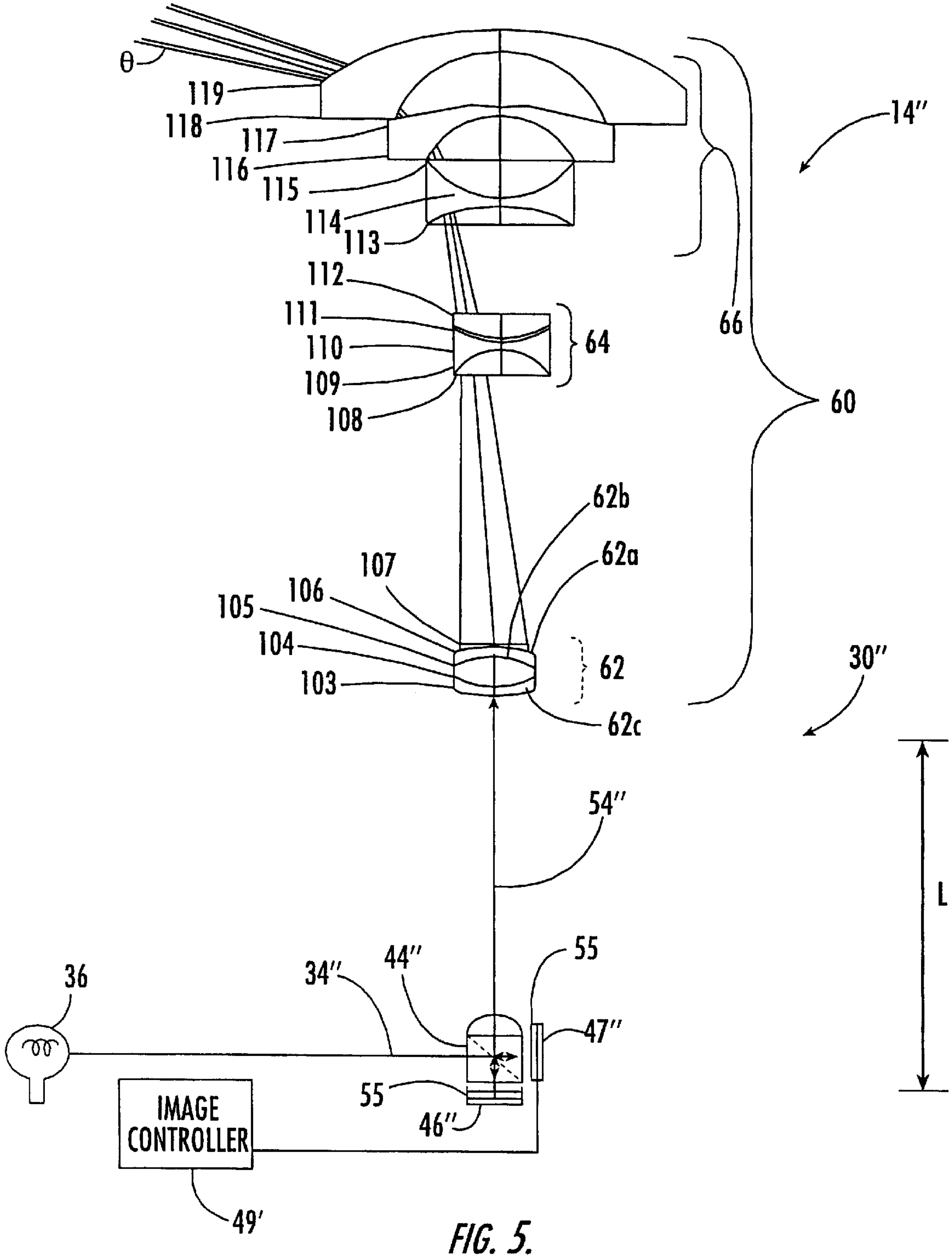
FIG. 5 is a schematic block diagram representation of a third embodiment of the projecting optics of FIGS. 1A and 1B.

Another alternate embodiment of the projector 14" of the present invention is illustrated in FIG. 5. The lamp 36 provides randomly-polarized white light along light path 34". Accordingly, white light which is linearly polarized orthogonal to the plane of FIG. 5 is reflected from polarizing beam splitter 44" to image source 46", and white light which is linearly polarized in the plane of FIG. 5 is transmitted by polarizing beam splitter 44" to image source 47".

In this embodiment, multi-color filters 55 are provided between each of the image sources 46"and 47" and the polarizing beam splitter 44". Suitable multi-color filters are marketed by Sanritz and others. Each of the multi-color filters 55 includes a plurality of single color filters, and each of these single color filters is aligned with a respective pixel of the respective image source 46" or 47". Approximately a third of the single color filters transmit red light, approximately a third of the single color filters transmit green light, and approximately a third of the single color filters transmit blue light.

A third of the pixels of each image source are thus associated with the simultaneous projection of images of each of the primary colors. Accordingly, full color images can be projected without the need for the multiple polarizing beam splitters of FIG. 2 or the color wheel and synchronization of FIG. 4. The light path 54" out of the polarizing beam splitter 44" simultaneously includes components of all three colors. The image controller 49" thus provides red, green and blue image components to the image sources 46" and 47" simultaneously. That is, a third of the pixels associated with the red single color filters generate the red image component, a third of the pixels associated with the green single color filters generate the green image component, and a third of the pixels associated with the blue single color filters generate the blue image component.

To this point, the image sources 46 and 47 have been discussed as being reflective liquid crystal displays such as ferroelectric liquid crystal displays. Alternately the image sources can include a liquid crystal layer and an image generator as discussed in parent application Ser. No. 08/593,699 entitled "Tiltable Hemispherical Optical Projection Systems And Methods Having Constant Angular Separation Of Projected Pixels" to Colucci et al. filed Jan. 29, 1996.

As is well known to those having skill in the art, the liquid crystal layers generally include an unrestricted, non-pixillated layer of nematic liquid crystal which is capable of rotating the polarization vector of light incident thereon by ninety degrees. The amount of light which is rotated by ninety degrees is determined by the intensity of an image which is projected onto the liquid crystal layer. Image generators project an array of image pixels onto the respective liquid crystal layer. Image generators may be a cathode ray tube, a field emitter array or any other two dimensional image array. The array of pixels from the image includes a predetermined height and predetermined width.

Figure 6:
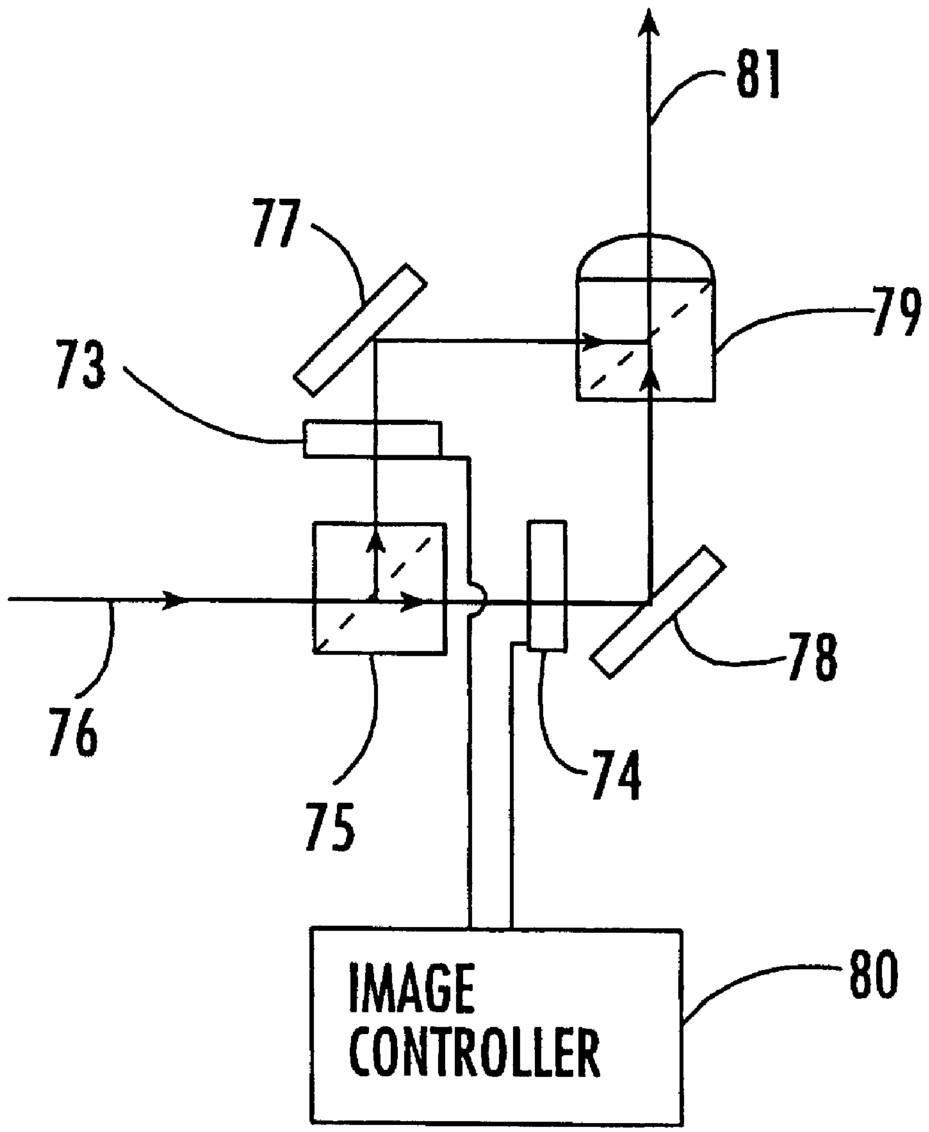
FIG. 6 is a schematic block diagram of a transmissive liquid crystal display assembly according to the present invention.

In yet another alternative, the image sources can be transmissive liquid crystal displays 73 and 74 as shown in FIG. 6. Suitable transmissive liquid crystal displays are marketed by Kopin and others. When using transmissive liquid crystal displays, a first polarizing beam splitter 75 splits randomly polarized light from input light path 76 so that light which is linearly polarized orthogonal to the plane of FIG. 6 is reflected to transmissive liquid crystal display 73, and light that is linearly polarized in the plane of FIG. 6 is transmitted to transmissive liquid crystal display 74.

Each transmissive liquid crystal display includes an array of pixels, with the intensity of each pixel being determined independently by the image controller 80. The polarized light from the polarizing beam splitter 75 passes through the transmissive liquid crystal displays 77 and 78. In particular, the polarization of a percentage of the light passing through each pixel is rotated by ninety degrees as a function of the intensity of that pixel. The light transmitted by each of the transmissive liquid crystal displays is reflected by respective mirrors 77 and 78 to a second polarizing beam splitter 79 which serves to combine the transmitted light from each of the transmissive liquid crystal displays into the output light path 81. The output light path thus includes pixels having two collimated beams with orthogonal polarizations.

As will be understood by one having skill in the art, the transmissive liquid crystal display assembly of FIG. 6 can be used in place of the respective reflective liquid display assembly of FIGS. 2, 4, and 5. If used in the projection system of FIG. 2, a transmissive liquid crystal display assembly can be substituted for each of the three combinations of a polarizing beam splitter 44 with two reflective liquid crystal displays 46 and 47. If used in the projection system of FIG. 4, a transmissive liquid crystal display assembly can be substituted for the combination of the polarizing beam splitter 44' and the reflective liquid crystal displays 46' and 47'.

If used in the projection system of FIG. 5, a transmissive liquid crystal display assembly can be substituted for the combination of the polarizing beam splitter 44" and the reflective liquid crystal displays 46" and 47". In this application, multi-color filters 55 may also be required adjacent each transmissive liquid crystal display as will be understood by one having skill in the art.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A dual polarization optical projection system, comprising:

a first image source comprising a first array of image pixels wherein said first image source generates a first pixel image having a first polarization;

a second image source comprising a second array of image pixels wherein said second image source generates a second pixel image having a second polarization orthogonal to said first polarization;

combining means for combining said first pixel image having said first polarization with said second pixel image having said second polarization to form a combined pixel image, such that each pixel of said combined pixel image corresponds to a combination of a first pixel from said first array of image pixels having said first polarization and a second pixel from said second array of image pixels having said second polarization; and constant angular separation hemispherical projecting means, for projecting said combined pixel image into a hemispherical projection having constant angular separation among adjacent pixels, such that said dual polarization optical projection system projects said combined pixel image onto hemispherical surfaces of varying radii without requiring spatial distortion correction of said first and second arrays of image pixels.

2. A dual polarization optical projection system according to claim 1 wherein said first and second pixel images comprise the same image so that the combined pixel image has an increased intensity.

3. A dual polarization optical projection system according to claim 1 wherein said first and second pixel images comprise different images so that the combined pixel image is a three-dimensional image.

4. A dual polarization optical projection system according to claim 1 wherein said first and second pixel images comprise the same image, offset from one another by a sub-pixel, so that the combined pixel image is of higher resolution than said first and second pixel images.

5. A dual polarization optical projection system according to claim 1 further comprising:

a dome including a truncated spherical inner dome surface, said constant angular separation hemispherical projecting means being mounted at the center of said dome to radially project said combined pixel image onto said inner dome surface.

6. A dual polarization optical projection system according to claim 1 wherein each of said first and second image sources comprises a respective transmissive liquid crystal display.

7. A dual polarization optical projection system according to claim 1 wherein each of said first and second image sources comprises a respective liquid crystal layer and an image generator for generating an image on said liquid crystal layer.

8. A dual polarization optical projection system according to claim 1 further comprising:

a first filter adjacent said first image source, said first filter comprising a first color portion adjacent a first pixel of said first image source which selectively passes a first color of light, and a second color portion adjacent a second pixel of said first image source which selectively passes a second color of light; and a second filter adjacent said second image source, said second filter comprising a first color portion adjacent a first pixel of said second image source which selectively passes said first color of light, and a second color portion adjacent a second pixel of said second image source which selectively passes said second color of light so that said combined pixel image includes said first and second colors.

9. A dual polarization optical projection system according to claim 1 further comprising:

a multi-color light source which provides light having a first color to said first and second image sources during a first predetermined time period and which provides light having a second color to said first and second image sources during a second predetermined time period so that said combined pixel image includes said first color during said first predetermined time period and includes said second color during said second predetermined time period.

10. A dual polarization optical projection system according to claim 1 further comprising:

a single color light source which provides light having a single color to said first and second image sources.

11. A dual polarization optical projection system, comprising:

a first image source comprising a first array of image pixels wherein said first image source generates a first pixel image having a first polarization;

a second image source comprising a second array of image pixels wherein said second image source generates a second pixel image having a second polarization orthogonal to said first polarization;

combining means for combining said first pixel image having said first polarization with said second pixel image having said second polarization to form a combined pixel image, such that each pixel of said combined pixel image corresponds to a combination of a first pixel from said first array of image pixels having said first polarization and a second pixel from said second array of image pixels having said second polarization;

means for projecting said combined pixel image from said combining means onto a hemispherical surface at a projection angle of at least 160 degrees; and means for tilting at least part of said projecting means, such that said projecting means projects said combined pixel image in one of a plurality of selectable positions.

12. A dual polarization projection system comprising:

a source of light which projects a first polarized light having a first polarization along a first light path, and which projects a second polarized light having a second polarization orthogonal to said first polarization along a second light path;

a first image source including a first array of image pixels in said first light path which selectively rotates a polarization vector of said first polarized light in response to an intensity of the image pixels;

a second image source including a second array of image pixels in said second light path which selectively rotates a polarization vector of said second polarized light in response to an intensity of the image pixels;

first polarizing filter means in said first light path, downstream of said first image source, for attenuating light from said first light path as a function of polarization;

second polarizing filter means in said second light path, downstream of said second image source, for attenuating light from said second light path as a function of polarization;

combining means for combining light from said first and second attenuated light paths into a combined light path; and a lens assembly in said combined light path downstream of said combining means which projects light from said combined light path onto a hemispherical surface at a projection angle of at least 160 degrees.

13. A dual polarization projection system according to claim 12 wherein said source of polarized light includes:

a high intensity source of randomly polarized light; and a polarizing beam splitter which projects said first polarized light having said first polarization along said first light path to said first image source, and which projects said second polarized light having said second polarization along said second light path to said second image source.

14. A dual polarization projection system according to claim 12 wherein said lens assembly comprises:

a collimating lens assembly in said combined light path downstream of said combiner; and a meniscus lens assembly in said combined light path downstream of said collimating lens assembly, to project the collimated light into an angular projection of at least 160 degrees.

15. A dual polarization projection system according to claim 14 wherein said collimating lens assembly comprises at least three lenses arranged along said optical path, each of said lenses including an index of refraction and a dispersion, each of the three lenses having a common ratio of index of refraction to dispersion.

16. A dual polarization projection system, according to claim 12 wherein said lens assembly projects said combined array of image pixels into a hemispherical projection having constant angular separation among adjacent pixels, such that said hemispherical optical projection system projects said array of pixels onto hemispherical surfaces of varying radii without requiring spatial distortion correction of said array of image pixels.

17. A dual polarization optical projection system according to claim 12 wherein said first and second image sources each comprise a respective reflective liquid crystal display.

18. A dual polarization optical projection system according to claim 12 wherein said first and second image sources each comprise a respective transmissive liquid crystal display.

19. A dual polarization optical projection system according to claim 12 wherein said first and second image sources each comprise a respective liquid crystal layer and image generator for generating an image on said liquid crystal layer.

20. A dual polarization projection system comprising:

a source of light which projects a first polarized light having a first polarization along a first light path, and which projects a second polarized light having a second polarization orthogonal to said first polarization along a second light path;

a first image source including a first array of image pixels in said first light path which selectively rotates a polarization vector of said first polarized light in response to an intensity of the image pixels;

a second image source including a second array of image pixels in said second light path which selectively rotates a polarization vector of said second polarized light in response to an intensity of the image pixels;

first polarizing filter means in said first light path, downstream of said first image source, for attenuating light from said first light path as a function of polarization;

second polarizing filter means in said second light path, downstream of said second image source, for attenuating light from said second light path as a function of polarization;

combining means for combining light from said first and second attenuated light paths into a combined light path; and a dome including a truncated spherical inner dome surface, and a lens assembly mounted at the center of said dome to radially project said combined array of pixels onto said inner dome surface.

21. A dual polarization optical projection system according to claim 20 further comprising:

means for tilting at least part of said lens assembly, such that said optical projection system projects said combined array of pixels onto a plurality of selectable positions on said inner dome surface.

22. A dual polarization optical projection system according to claim 20 wherein each of said arrays of image pixels has an image size, and wherein said lens assembly is spaced apart from each of said image sources by a separation distance which is at least six times said image size.

23. A dual polarization optical projection system according to claim 20 further comprising:

a first filter adjacent said first image source, said first filter comprising a first color portion adjacent a first pixel of said first image source which selectively passes a first color of light, and a second color portion adjacent a second pixel of said first image source which selectively passes a second color of light; and a second filter adjacent said second image source, said second filter comprising a first color portion adjacent a first pixel of said second image source which selectively passes said first color of light, and a second color portion adjacent a second pixel of said second image source which selectively passes said second color of light so that said combined pixel image includes said first and second colors.

24. A dual polarization optical projection system according to claim 20 further comprising:

a multi-color light source which provides light having a first color to said first and second image sources during a first predetermined time period and which provides light having a second color to said first and second image sources during a second predetermined time period so that said combined pixel image includes said first color during said first predetermined time period and includes said second color during said second predetermined time period.

25. A dual polarization optical projection system according to claim 20 further comprising:

a single color light source which provides light having a single color to said first and second image sources.

26. A dual polarization optical projection method, comprising the steps of:

generating a first pixel image having a first polarization;

generating a second pixel image having a second polarization orthogonal to said first polarization; and combining said first pixel image having said first polarization with said second pixel image having said second polarization to form a combined pixel image, such that each pixel of said combined pixel image corresponds to a combination of a first pixel from said first pixel image having said first polarization and a corresponding second pixel from said second pixel image having said second polarization; and projecting said combined pixel image into a hemispherical projection having constant angular separation among adjacent pixels, such that said dual polarization optical projection method projects said combined pixel image onto hemispherical surfaces of varying radii without requiring spatial distortion correction of said first and second pixel images.

27. A dual polarization optical projection method according to claim 26 wherein said first and second pixel images comprise the same image so that the combined pixel image has an increased intensity.

28. A dual polarization optical projection method according to claim 26 wherein said first and second pixel images comprise different images so that the combined pixel image is a three-dimensional image.

29. A dual polarization optical projection method according to claim 26 wherein said first and second pixel image comprise the same image, offset from one another by a sub-pixel, so that the combined pixel image is of higher resolution than said first and second pixel images.

30. A dual polarization optical projection method, comprising the steps of:

generating a first pixel image having a first polarization;

generating a second pixel image having a second polarization orthogonal to said first polarization;

combining said first pixel image having said first polarization with said second pixel image having said second polarization to form a combined pixel image, such that each pixel of said combined pixel image corresponds to a combination of a first pixel from said first pixel image having said first polarization and a corresponding second pixel from said second pixel image having said second polarization;

projecting said combined pixel image onto a hemispherical surface at a projection angle of at least 160 degrees; and tilting said combined pixel image in one of a plurality of selectable positions.

31. A dual polarization projection method comprising the steps of:

projecting a first polarized light having a first polarization along a first light path; and projecting a second polarized light having a second polarization orthogonal to said first polarization along a second light path;

selectively rotating a polarization vector of said first polarized light in response to an intensity of a first array of image pixels;

selectively rotating a polarization vector of said second polarized light in response to an intensity of a second array of image pixels;

attenuating light from said first light path as a function of polarization;

attenuating light from said second light path as a function of polarization;

combining light from said first and second attenuated light paths into a combined light path; and projecting light from said combined light path onto a hemispherical surface at a projection angle of at least 160 degrees.

32. A dual polarization projection method comprising the steps of:

projecting a first polarized light having a first polarization along a first light path; and projecting a second polarized light having a second polarization orthogonal to said first polarization along a second light path;

selectively rotating a polarization vector of said first polarized light in response to an intensity of a first array of image pixels;

selectively rotating a polarization vector of said second polarized light in response to an intensity of a second array of image pixels;

attenuating light from said first light path as a function of polarization;

attenuating light from said second light path as a function of polarization;

combining light from said first and second attenuated light paths into a combined light path; and projecting said combined array of image pixels into a hemispherical projection having constant angular separation among adjacent pixels, to project said array of pixels onto hemispherical surfaces of varying radii without requiring spatial distortion correction of said array of image pixels.

33. A dual polarization projection method comprising the steps of:

projecting a first polarized light having a first polarization along a first light path; and projecting a second polarized light having a second polarization orthogonal to said first polarization along a second light path;

selectively rotating a polarization vector of said first polarized light in response to an intensity of a first array of image pixels;

selectively rotating a polarization vector of said second polarized light in response to an intensity of a second array of image pixels;

attenuating light from said first light path as a function of polarization;

attenuating light from said second light path as a function of polarization; and combining light from said first and second attenuated light paths into a combined light path; and tilting at least part of said combined light path onto a plurality of selectable positions on said inner dome surface.

34. A dual polarization optical projection system, comprising:

a first image source comprising a first array of image pixels wherein said first image source generates a first pixel image having a first polarization;

a second image source comprising a second array of image pixels wherein said second image source generates a second pixel image having a second polarization orthogonal to said first polarization; and combining means for combining said first pixel image having said first polarization with said second pixel image having said second polarization to form a combined pixel image, such that each pixel of said combined pixel image corresponds to a combination of a first pixel from said first array of image pixels having said first polarization and a second pixel from said second array of image pixels having said second polarization;

wherein each of said first and second image sources comprises a respective reflective liquid crystal display;

wherein the combining means comprises a polarizing beam splitter wherein the first pixel image is reflected off the first image source to the polarizing beam splitter, wherein the second pixel image is reflected off the second image source to the polarizing beam splitter, and wherein the first and second reflected pixel images are combined in the polarizing beam splitter.

35. A dual polarization optical projection system according to claim 34 wherein a radiation source is projected onto the polarizing beam splitter, and wherein the polarizing beam splitter transmits respective first and second orthogonally polarized beams to the first and second reflective liquid crystal displays.

36. A dual polarization optical projection system, comprising:

a first image source comprising a first array of image pixels wherein said first image source generates a first pixel image having a first polarization;

a second image source comprising a second array of image pixels wherein said second image source generates a second pixel image having a second polarization orthogonal to said first polarization wherein each of said first and second pixel images has a common image size;

combining means for combining said first pixel image having said first polarization with said second pixel image having said second polarization to form a combined pixel image, such that each pixel of said combined pixel image corresponds to a combination of a first pixel from said first array of image pixels having said first polarization and a second pixel from said second array of image pixels having said second polarization; and a projection lens assembly which projects said combined pixel image onto a hemispherical surface at a projection angle of at least 160 degrees, said lens assembly being spaced apart from said first and second image sources by a separation distance which at least six times said image size.

* * * * *